United States Patent [19]

Lloyd-Lucas et al.

[11] 4,160,073

[45] Jul. 3, 1979

[54] FIRE PROOFING COMPOSITIONS

[75] Inventors: John B. Lloyd-Lucas, Pinvin, Nr. Pershore; Christopher Lloyd-Lucas, Hunt End, Nr. Redditch, both of England

[73] Assignee: Advanced Fireproofing Systems Limited, England

[21] Appl. No.: 776,090

[22] Filed: Mar. 9, 1977

[30] Foreign Application Priority Data

Mar. 12, 1976 [GB] United Kingdom ............... 09928/76

[51] Int. Cl.$^2$ ................................................. C08J 9/00
[52] U.S. Cl. ........................... 521/122; 260/DIG. 24; 521/85; 521/91; 521/128; 521/178
[58] Field of Search ..................................... 260/2.5 FP

[56] References Cited

U.S. PATENT DOCUMENTS 3,839,239 10/1974 Godfried ......................... 260/2.5 FP
3,981,832 9/1976 Godfried ......................... 260/2.5 FP

FOREIGN PATENT DOCUMENTS 1095857 12/1967 United Kingdom ............... 260/2.5 FP
1373908 11/1974 United Kingdom ............... 260/2.5 FP Primary Examiner—Morton Foelak
Attorney, Agent, or Firm—Kenway & Jenney

[57] ABSTRACT

Intumescent coating composition for use in the spray-coating of beams and other structural members to protect them against the effect of fire and containing an epoxy resin film-forming binder and melamine phosphate spumific agent, in a weight ratio of less than 7.5:1, are improved by the inclusion therein of 1 to 15 percent by weight of inorganic fibres having a silica content of less than about 50 percent by weight of an aluminium oxide content preferably greater than about 50 percent by weight.

The inorganic fibres may be mineral or ceramic and have a length of less than about 1 mm and a mean diameter of less than about 0.01 mm. The epoxy resin may be diglycidylether capable of being cured by the addition of a curing agent.

19 Claims, No Drawings

FIRE PROOFING COMPOSITIONS

The present invention relates to fire-retardant compositions which intumesce to form heat-insulating chars when exposed to fire.

Such compositions may be applied to the structural members in buildings or to structural steel frameworks and serve to lessen the tendency of such structures, to collapse under the influence of high temperature caused by fires.

Fire retarding compositions which intumese, that is swell upon heating, are well known and are, for example, described in British Pat. Nos: 1,095,857 and 1,373,908.

It has been proposed to incorporate inorganic fibres, specifically glass fibres, into intumescent compositions in order to improve their effectiveness by increasing the structural strength.

We have now found that further improvements in the effectiveness of intumescent compositions in protecting structures at temperatures in excess of 800° C. can be obtained when the inorganic fibres are formed from materials having a silica content (expressed as $SiO_2$) of less than 50% by weight and an aluminium oxide content (expressed as $Al_2O_3$) of preferably greater than 50% by weight.

Accordingly, therefore, the present invention provides an intumescent coating composition comprising a film-forming binder and a spumific agent in a weight ratio of preferably less than 7.5 to 1, and from 1 to 15% by weight, based on the weight of the other components of the composition, of inorganic fibres having a silica content of less than 50% by weight and preferably having an $Al_2O_3$ content greater than 50% by weight.

Suitable inorganic fibres include mineral fibres which typically have a silica content of about 47.5% by weight and an $Al_2O_3$ content of about 13% by weight, and ceramic fibres which typically have a $SiO_2$ content of 38% and an $Al_2O_3$ content of 62% by weight. Fibres formed from alluminia may also be used.

It is to be understood that, in the context of the present specification, the term "fibres" includes staple fibres and whiskers, e.g. single crystal ceramic whiskers. Preferably the spumific agent to resin ratios (by weight) are less than 2:1. A weight ratio of 1.14:1 is especially preferred.

The preferred film-forming binder is an expoxy resin and the preferred spumific agent is melamine phosphate.

Especially suitable epoxy resins are diglycidylethers containing the grouping

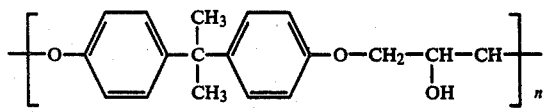

"n" is preferably in the range 0-10 at which level the resin is a low viscosity liquid at room temperature (about 0.5 to 1.0 poise at 25° C.). Intumescent compositions produced from such resins can be readily applied by spraying. At higher "n" values the viscosity increases and the compositions may have to be applied by trowelling. The addition of a heat-vapourizable inert liquid may be employed to reduce the viscosity of such resins.

Suitable curing agents for curing diglycidylether resins include carboxylic acid anhydrides, dibasic organic acids, Lewis acids, Lewis bases, aliphatic primary amines, aliphatic secondary amines, aromatic amines and amino-polyamines, the latter being especially useful. The weight ratio of curing agent to resin is preferably in the ratio 7:3, although ratios of up to 7:6 may be employed.

Since the preferred film-forming binder material is an epoxy resin which requires the addition of a curing agent and since the curing agent may be added to the other components of the composition immediately prior to the use thereof, the invention also includes a curable coating composition comprising an epoxy resin and a phospate of melamine in a weight ratio of preferably less than 7.5:1 and from 1 to 15% by weight of inorganic fibres having a silica content of less than 50% by weight and preferably having an $Al_2O_3$ content of greater than 50% by weight.

If desired a portion of the malamine phosphate may be replaced by the equivalent weight of melamine borate. Preferably not more than 20% by weight of the melamine salt is melamine borate.

In order to facilitate the application of the intumescent composition to, for example, a steel structure by spraying, the length of the inorganic fibres should preferably be short, that is less than 1 millimeter. Suitably the fibres may have a diameter up to 0.01 millimeters.

One advantage of using the inorganic fibres referred to above in compositions of the present invention is that higher spumific agent to resin ratios can be employed than when using glass fibres for example, whilst retaining the ability to apply the intumescent composition by spraying techniques without the addition of thinning agents such as inert volatile liquids. However the use of glass fibres in conjunction with the defined inorganic fibres in compositions of present invention is not excluded.

In the absence of fibre reinforcement intumescent compositions having high spumific agent to resin ratios tend to "blow" off when subjected to fire leaving an inadequate amount of material to provide protection against the fire.

If desired other additions may be used to vary the rate of curing or give other special effects. Thus an accelerator may be added to increase the rate of curing as may a gelling agent to avoid "slumping" when the composition is applied by spraying. Up to at least 10% by weight of gelling agent may be added without significantly affecting the efficiency of the composition.

Small amounts, i.e. less than about 5 percent by weight, of additives such as boric oxide, to produce a softer char when the composition is exposed to fire, or sodium nitrate, to improve the adherence of the composition to the structure may also be used.

Additional fillers, e.g. glass microspheres or powdered silica, may also be added to the composition to facilitate spraying; it is preferably that the total content by weight of filler plus inorganic fibre does not exceed 15% of the total components of the composition. An especially suitable material for use as a filler is cristobolite.

The following examples illustrate intumescent compositions falling within the scope of the present invention.

In the examples the epoxy resin is that sold as Araldite (Registered Trade Mark) MY753 by CIBA Limited of Duxford, Cambridgeshire and has a "n" value in the range 0.1 to 0.2; the inorganic fibres are ceramic fibres sold as Fiberfrax (Registered Trade Mark) chopped fibres sold by the Carborumdum Company of Rainhma, St. Helens, Lancashire having a mean length of 0.3 millimeters and a mean diameter of 0.002 millimeters. The curing agent for the epoxy resin is Versamid (Registered Trade Mark) V125 an aminopolyamine supplied by Cray Valley Products Limited, Orpington, London.

EXAMPLE 1

To 35 parts by weight of an epoxy resin (Araldite MY753) was added 40 parts by weight of melamine phosphate and 8 parts by weight of ceramic fibre (Fiberfrax chopped fibres) and the mixture stirred to effect through mixing of the components. To the stirred mixture was then added 15 parts by weight of the curing agent (Versamid V125) and 2 parts by weight of an accelerator (DY063) and the mixture again thoroughly stirred. The resin to phosphate ratio is 1 to 1.14.

The final stirred mixture could be readily sprayed onto a steel beam at a thickness greater than 5 millimeters.

EXAMPLES 2-7

Further compositions containing the same epoxy resin the same parts by weight as in Example 1, melamine phosphate, curing agent and additional constituents in parts by weight as set out in the table, were prepared according to the method of example 1, the additional constituents being included in the mixture before addition of the curing agent. Each composition could be readily sprayed onto steel beams at thickness in excess of 5 mm.

5. A composition according to claim 2 wherein the inorganic fibres have an aluminium oxide content, expressed as $Al_2O_3$, greater than about 50 percent by weight.

6. A composition according to claim 5 wherein the inorganic fibres are ceramic fibres.

7. A composition according to claim 6 wherein the fibres have an $SiO_2$ content of about 38 percent and an $Al_2O_3$ content of about 62 percent by weight.

8. A composition according to claim 1 wherein the epoxy resin is a diglycidylether containing the grouping

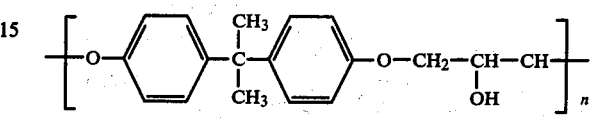

9. A composition according to claim 8 wherein n has a value in the range 0-1.0.

10. A composition according to claim 2 wherein the portion of the melamine phosphate is replaced by an equivalent weight of melamine borate, the melamine borate being present to an extent not exceeding 20 percent by weight of the total melamine salt.

11. A composition according to claim 1 including a filler; the content by weight of the filler plus inorganic fibre being less than about 15 percent of the total weight of the components in the composition.

12. A composition according to claim 11 wherein the filler is cristobolite.

13. A composition according to claim 12 wherein the

| Ex. | Curing Agent V125 | Mel. Phos. | Fiberfrax | Accel. DY063 | Gel. Agent | Filler[2] | Boric Oxide | sod. nit. | glass fibre | glass[5] microspheres | mel. borate |
|---|---|---|---|---|---|---|---|---|---|---|---|
| 2 | 15 | 40 | 8 | 2 | 2 | — | — | — | — | — | — |
| 3 | 15 | 40 | 8 | 2 | 2 | 2 | — | — | — | — | — |
| 4 | 15 | 40 | 8 | 2 | 2 | 2 | 1.5 | — | — | — | — |
| 5 | 15 | 40 | 8 | 2 | 2 | 2 | 1.5 | 0.5 | — | — | — |
| 6 | 30[3] | 40 | 8 | 2 | 2 | 2 | — | — | — | — | — |
| 7 | 15 | 50[4] | 10 | 1 | 2 | — | — | — | — | — | — |
| 8 | 15 | 40 | 4 | 2 | 2 | — | — | — | — | 5 | — |
| 9 | 15 | 40[6] | 4 | 2 | — | — | — | — | 2 | — | 4 |

[1]Bentone (Registered Trade Mark) 27 supplied by Berk Limited, Basingstoke, Hants.
[2]Cristobolite supplied by Hoben & Davies Limited, Newcastle, Staffs.
[3]Resin : curing agent ratio 7:6
[4]Resin : phosphate ratio 1:1.43
[5]Sold by Emerson & Cumming, Scunthorpe, Lincs.
[6]Resin : phosphate ratio 1 : 1.26

We claim:

1. An intumescent coating composition comprising a film-forming epoxy resin binder and a spumific agent in a weight ratio of less than 7.5:1 and, uniformably dispersed therethrough, from about 1 to about 15 percent by weight, based on the weight of the other components of the composition, of inorganic fibres having a silica content, expressed as $SiO_2$, of less than 50 percent by weight, and an aluminum oxide content, expressed as $Al_2O_3$, of at least 13% by weight.

2. A composition according to claim 1 wherein the spumific agent is melamine phosphate and the composition includes a curing agent for the epoxy resin.

3. A composition according to claim 2 wherein the inorganic fibres have a length of less than one millimeter and a diameter of not greater than 0.01 millimeters.

4. A composition according to claim 2, wherein the inorganic fibres are mineral fibres.

filler comprises glass micro-spheres.

14. An intumescent coating composition comprising an epoxy resin and a melamine phosphate in a weight ratio of less than 7.5:1 and containing, uniformly dispersed therethrough, from about 1 to about 15 percent by weight of inorganic fibres having a silica content expressed as $SiO_2$ of less than about 50 percent by weight, and an aluminum oxide content, expressed as $Al_2O_3$, of at least 13% by weight, said composition being capable of being cured by the addition of a curing agent thereto.

15. A composition according to claim 14 wherein the inorganic fibres are mineral fibres.

16. A composition according to claim 15 wherein the fibres have an $SiO_2$ content of about 47.5 percent by weight and an aluminium oxide content, expressed as $Al_2O_3$, of about 13 percent by weight.

17. A composition according to claim 14 wherein the inorganic fibres have an aluminium oxide content, expressed as $Al_2O_3$, greater than about 50 percent by weight.

18. A composition according to claim 17 wherein the inorganic fibres are ceramic fibres.

19. A composition according to claim 18 wherein the fibres have an $SiO_2$ content of about 38 percent and an $Al_2O_3$ content of about 62 percent by weight.

* * * * *